(12) United States Patent  
Clark

(10) Patent No.: US 9,140,215 B2
(45) Date of Patent: Sep. 22, 2015

(54) ROCKET ENGINE PRESSURE SENSE LINE

(75) Inventor: Jim A. Clark, Jupiter, FL (US)

(73) Assignee: AEROJET ROCKETOYNE OF DE, INC., Canoga Park, CA (US)

(*) Notice: Subject to any disclaimer, the term of this patent is extended or adjusted under 35 U.S.C. 154(b) by 862 days.

(21) Appl. No.: 13/420,021

(22) Filed: Mar. 14, 2012

(65) Prior Publication Data
US 2013/0239545 A1 Sep. 19, 2013

(51) Int. Cl.
F02K 9/60 (2006.01)
G01M 15/00 (2006.01)
G01M 3/04 (2006.01)
G01F 1/36 (2006.01)
F02K 9/56 (2006.01)
G01F 1/44 (2006.01)

(52) U.S. Cl.
CPC .. *F02K 9/60* (2013.01); *G01M 3/04* (2013.01); *G01M 15/00* (2013.01); *F02K 9/56* (2013.01); *F05D 2260/80* (2013.01); *F05D 2270/301* (2013.01); *G01F 1/36* (2013.01); *G01F 1/363* (2013.01); *G01F 1/44* (2013.01)

(58) Field of Classification Search
CPC ...... F02K 9/60–9/68; F02K 9/00; F02K 9/62; F02K 9/96; F02K 9/97; F02K 9/40; F02K 9/54; F02K 9/42; F02K 9/425; F02K 9/46; F02K 9/50; F02K 9/52; F02K 9/56; F02K 9/563; F02K 9/566; F02K 9/58; G01F 1/44; G01F 1/36; G01F 3/363; F05D 2270/301; F05D 2260/80; F02D 41/06–41/12; G01M 15/00; B64G 1/402
USPC ............ 60/257–260, 739; 73/861.63, 861.52, 73/114.1–114.06
See application file for complete search history.

(56) References Cited

U.S. PATENT DOCUMENTS

| | | | |
|---|---|---|---|
| 2,763,126 A * | 9/1956 | Halford et al. | 60/259 |
| 2,940,273 A | 6/1960 | Leonard, Jr. | |
| 3,150,935 A | 9/1964 | Matteson | |
| 3,385,063 A * | 5/1968 | Brown, Jr. | 60/225 |
| 3,948,042 A * | 4/1976 | Beardsley et al. | 60/242 |
| 4,039,000 A * | 8/1977 | Fletcher et al. | 137/207 |
| 4,165,608 A * | 8/1979 | Diesinger et al. | 60/245 |
| 6,619,031 B1 * | 9/2003 | Balepin | 60/246 |

* cited by examiner

*Primary Examiner* — Phutthiwat Wongwian
*Assistant Examiner* — Alain Chau
(74) *Attorney, Agent, or Firm* — Joel G Landau

(57) ABSTRACT

A rocket engine with a manifold is in communication with a combustion chamber. A sense line extends through the propellant manifold and into the combustion chamber. The sense line includes a venturi arranged downstream from the combustion chamber, and at least one aperture fluidly connecting the propellant manifold to a sense-line passageway downstream from the venturi. A method of sensing conditions in a combustion chamber includes exposing an end of a sense line to the combustion chamber, creating a low static pressure in the sense line at a location upstream from the end, introducing a fluid at the location to purge the sense line, and sensing the conditions downstream from the location.

11 Claims, 3 Drawing Sheets

ROCKET ENGINE PRESSURE SENSE LINE

BACKGROUND

The present invention relates to a rocket engine, and more particularly to a pressure-sense line associated with an injector assembly for the rocket engine.

Typically, a rocket engine includes a sense line extending through the injector assembly and fluidly connected to a combustion chamber, for example, to measure such parameters such as combustion chamber pressure. The sense line is typically a straight tube having a uniform inner diameter along its length. Multiple holes, smaller than the tube inner diameter, may be located in the tube wall. The holes permit a purge fluid, such as gaseous hydrogen, to enter the sense line during engine operation.

The engine may be sensitive to the presence of water vapor, in particular during start transients.

SUMMARY

In one example embodiment, a rocket engine with a propellant manifold is in communication with a combustion chamber. A pressure-sense line extends through the propellant manifold and into the combustion chamber. The sense line includes a venturi arranged downstream from the combustion chamber, and at least one aperture fluidly connecting the propellant manifold to a sense-line passageway downstream from the venturi.

In a further embodiment of any of the above, a device is arranged downstream from the passageway.

In a further embodiment of any of the above, the device is a pressure transducer.

In a further embodiment of any of the above, the device is a thrust control valve.

In a further embodiment of any of the above, the sense-line venturi includes a throat, and at least one venturi-wall is located near the throat.

In a further embodiment of any of the above, the venturi throat includes a first diameter and the sense-line passage includes a second diameter. The second diameter is larger than the first diameter.

In a further embodiment of any of the above, a fuel manifold and an oxidizer manifold are included, wherein the propellant manifold is the fuel manifold.

In a further embodiment of any of the above, the sense line is provided by a tube, and the tube penetrates an annular passageway of the fuel manifold.

In a further embodiment of any of the above, the fuel and oxidizing manifolds are arranged over one another to provide a disc-shaped structure, and the annular passageway is arranged about a perimeter of the structure.

In another example embodiment, a method of sensing conditions in a combustion chamber includes exposing an end of a sense line to the combustion chamber, creating a low static pressure in the sense line at a location downstream from the end, introducing a fluid at the location to purge the sense line, and sensing the conditions downstream from the location.

In a further embodiment of any of the above, the creating step includes providing a venturi with a throat, and the throat provides the location.

In a further embodiment of any of the above, the introducing step includes providing gaseous fuel through at least one hole in the sense line wall near the venturi throat.

In a further embodiment of any of the above, the sensing step includes cooperating with a thrust control valve.

In a further embodiment of any of the above, the sensing step includes sensing a pressure.

In another example embodiment, an injector assembly for a rocket engine includes a fuel manifold and an oxidizer manifold. A sense line extends through the fuel manifold and into the combustion chamber. The sense line includes a venturi arranged downstream from the combustion chamber, and at least one aperture fluidly connecting the fuel manifold to a passageway downstream from the venturi. The venturi includes a throat, and the aperture is located near the throat. The throat includes a first diameter and the sense-line passage includes a second diameter. The second diameter is larger than the first diameter.

In another example embodiment, an engine includes a vessel. The engine also includes a combustion chamber. A pressure sensor is in fluid communication with the combustion chamber via a conduit. The conduit has a venturi and an aperture. The venturi is between the chamber and the sensor. The aperture is between the venturi and the sensor. The aperture is in fluid communication with the vessel.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
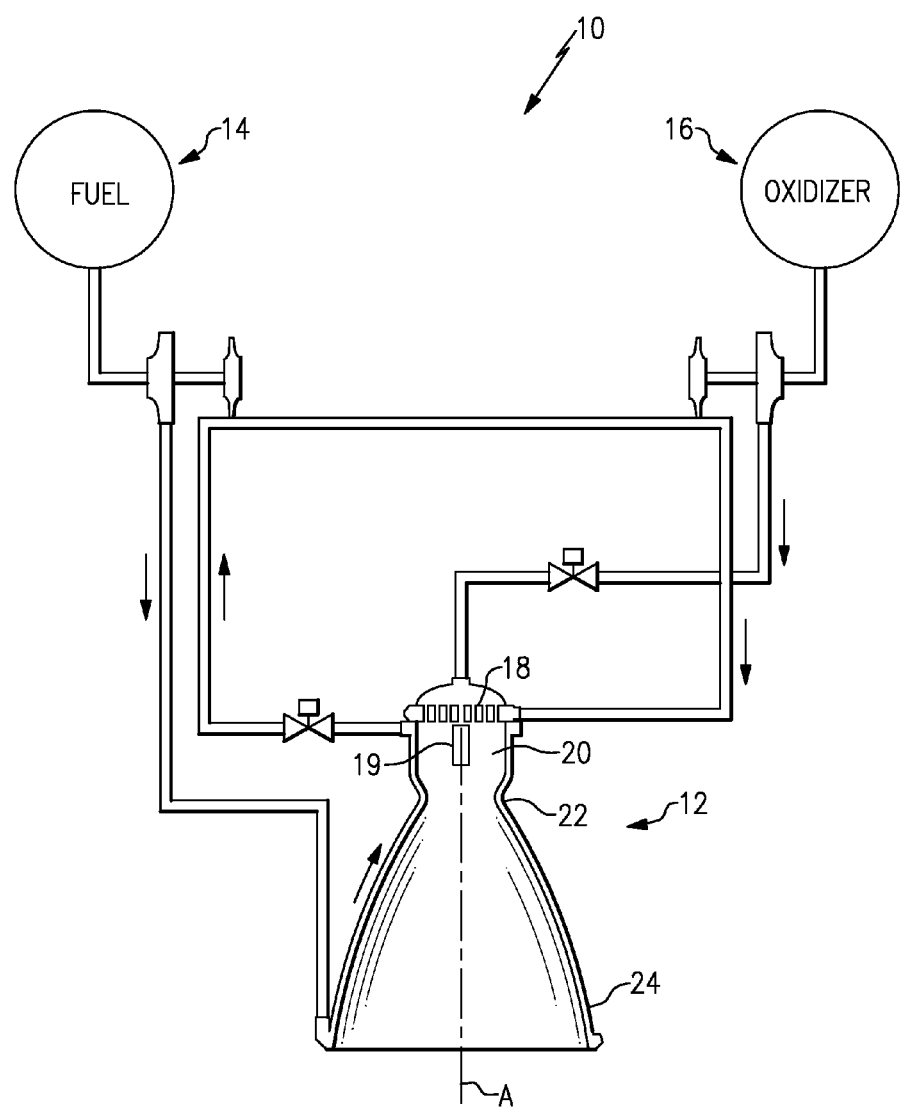
FIG. 1 is a general schematic sectional view of an exemplary rocket engine.

FIG. 1 illustrates a general schematic view of a rocket engine 10. The engine 10 generally includes a nozzle 12 in communication with a propellant system having a fuel system 14 and an oxidizer system 16. While applicable to various rocket engines that utilize various fluid propellants, the example engine disclosed herein utilizes gaseous hydrogen as the fuel and liquid oxygen as the oxidizer. The disclosed rocket engine 10 is exemplary. It should further be understood that the disclosed pressure sense line may be used in a gas turbine engine or an internal combustion engine.

The fuel system 14 and the oxidizer system 16 provide the fuel and the oxidizer into the nozzle 12 through an injector assembly 18. The nozzle 12 generally includes a combustion chamber 20, a throat 22 and a skirt 24, which define a thrust axis A. An igniter 19 initiates combustion in the combustion chamber 20. Steam is produced in the combustion chamber 20 during engine operation, which includes the start transient. Combustion gases downstream of the injector assembly 18 flow through the nozzle 12 in the axial direction, passing first through the combustion chamber 20, then through the throat 22, and finally through the skirt 24 to provide thrust.

Figure 2:
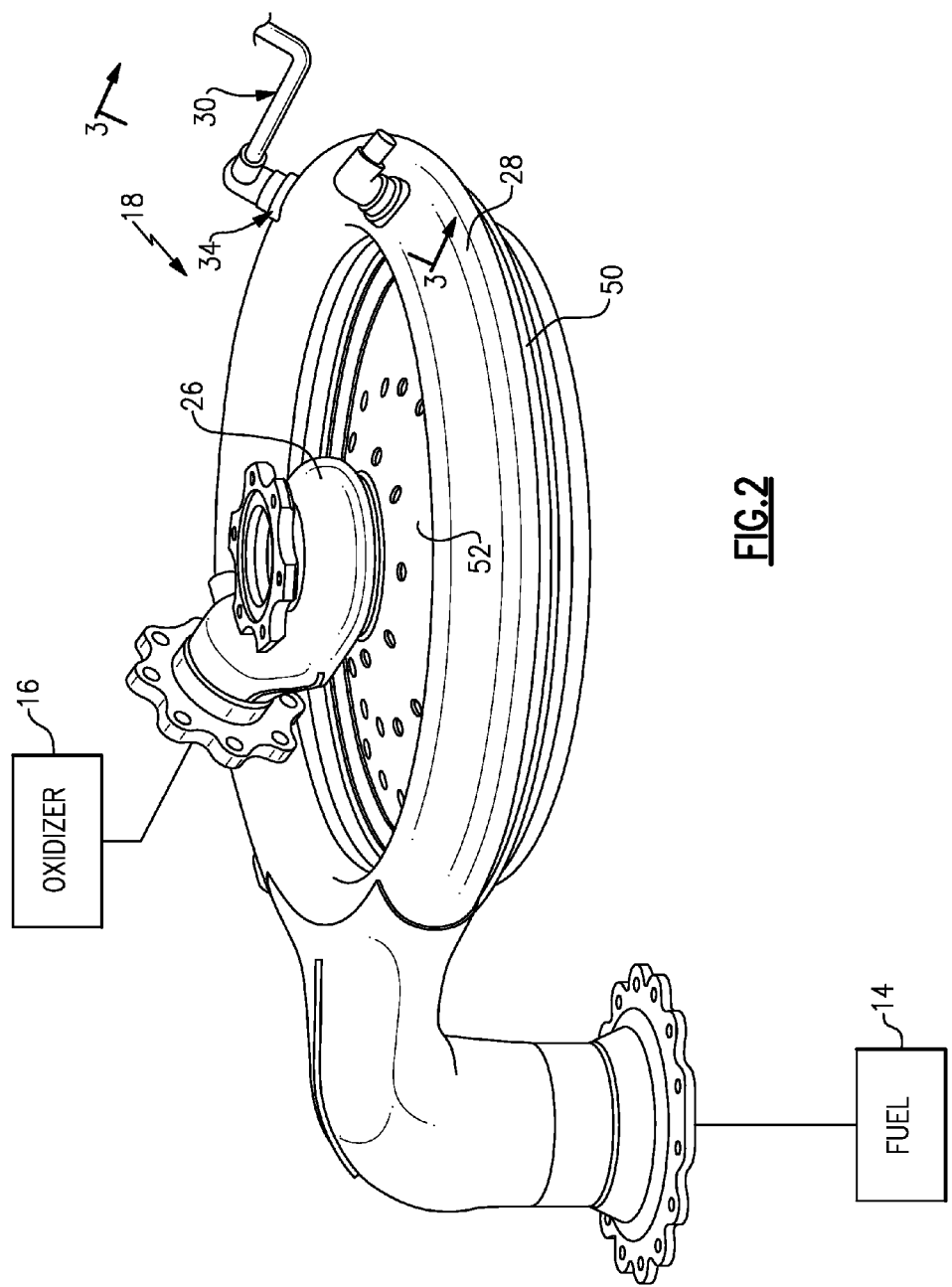
FIG. 2 is an expanded schematic view of an injector assembly.

With reference to FIG. 2, the injector assembly 18 generally includes an oxidizer manifold 26 and a fuel manifold 28. The oxidizer manifold 26 and the fuel manifold 28 may be at least partially defined along the thrust axis A.

Figure 3:
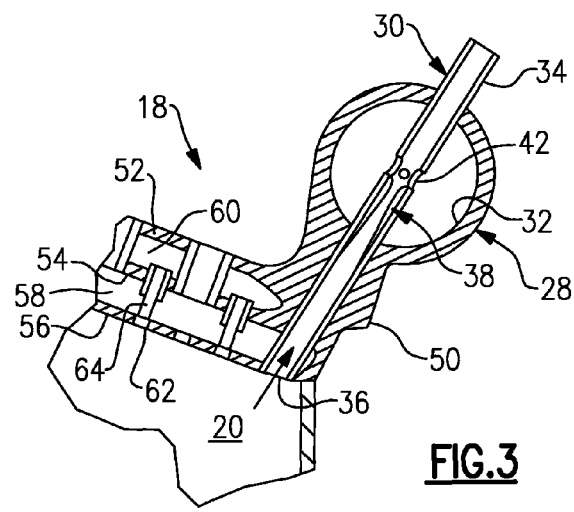
FIG. 3 is a cross-sectional view of the injector assembly shown in FIG. 2 taken along line 3-3.

Referring to FIG. 3, the injector assembly 18 includes first, second and third plates 52, 54, 56 that are axially spaced from one another to provide fuel and oxidizer cavities 58, 60. The first, second and third plates 52, 54, 56 are disk-shaped structures. The fuel manifold 28 includes an annular passageway 32 provided at a perimeter 50 of the injector assembly 18. The annular passageway 32 is in fluid communication with the fuel cavity 58.

The oxidizer manifold 26 communicates oxidizer into the oxidizer cavity 60, and the fuel manifold 28 communicates fuel into the fuel cavity 58. It should be appreciated that various cavity configurations and plate architectures are applicable to the disclosed teachings. The oxidizer cavity 60 communicates with the combustion chamber 20 (FIG. 1) through a plurality of oxidizer injector passages 64. The fuel cavity 58 communicates with the combustion chamber 20 (FIG. 1) through a plurality of fuel injector passages 62, which circumscribe the oxidizer injector passages 64.

A sense line 30 is supported on the injector assembly 18. In one example, the sense line 30 includes a conduit or tube 34, which extends linearly in the example. The tube 34 extends through the annular passageway 32 to an end 36 extending through the third plate 56 into the combustion chamber 20. The tube 34 extends out of the annular passageway 32 to the exterior of the injector assembly 18 and opposite the combustion chamber 20. Although the sense line 30 shown is used in connection with the fuel manifold 28, it should be understood that the sense line 30 may also be used with any vessel, such as a manifold, pressurized chamber, or propellant conduit.

Figure 4:
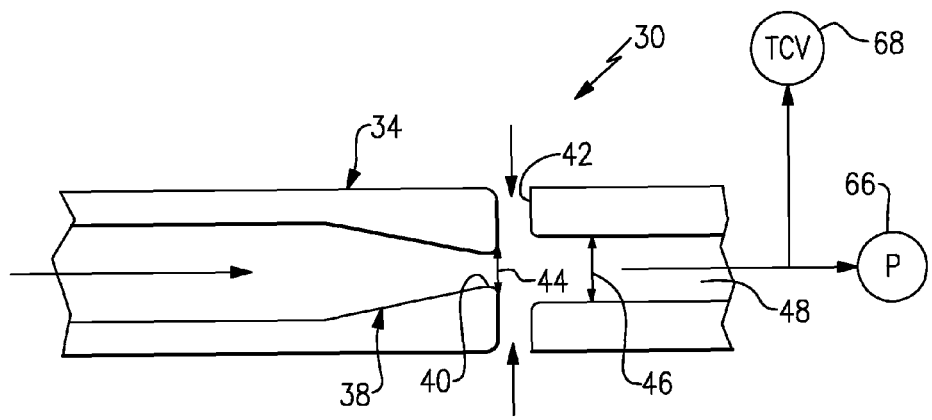
FIG. 4 is an enlarged cross-sectional view of an example sense line illustrated in FIG. 3.

The sense line 30 includes a venturi 38 arranged downstream from the combustion chamber 20. The sense line 30 includes at least one aperture 42 fluidly connected to the annular passageway 32 downstream from the venturi 38. Such a sense-line configuration may be referred to as an ejector. As best shown in FIG. 4, the venturi 38 includes a throat 40 having a first diameter 44. A passageway 48 is arranged downstream from the throat 40 and includes a second diameter 46 that is greater than the first diameter 44.

Devices, such as a pressure transducer 66 and/or a thrust control valve 68, are arranged downstream from the passageway 48 and in fluid communication with the tube 34. Water vapor may interfere with the operation of the thrust control valve 68 or prevent accurate measurements by the pressure transducer 66.

In operation, conditions of the combustion chamber 20 are sensed by exposing the sense-line end 36 to the combustion chamber 20. During the engine start transient, low static pressure is created in the sense line 30 by the venturi 38 at a location downstream from the sense-line end 36. A fluid, such as gaseous hydrogen, is introduced near the throat 40 to purge the sense line 30 during engine start and steady-state operation. In this manner, any water vapor present in the sense line 30 during an engine-start transient is purged from the sense line 30 to prevent contamination of downstream devices, such as the pressure transducer 68 and the thrust control valve 68.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. An engine comprising: a propellant manifold in communication with a combustion chamber; and a pressure-sense line extending through the propellant manifold and into the combustion chamber, the sense line including a venturi arranged downstream from the combustion chamber, and the sense line including at least one aperture fluidly connecting the propellant manifold to a sense-line passageway downstream from the venturi.

2. The engine according to claim 1, comprising a device arranged downstream from the sense-line passageway.

3. The engine according to claim 2, wherein the device is a pressure transducer.

4. The engine according to claim 2, wherein the device is a thrust control valve.

5. The engine according to claim 1, wherein the sense-line venturi includes a throat, and at least one venturi-wall aperture is located near the throat.

6. The engine according to claim 5, wherein the venturi throat includes a first diameter and the sense-line passage includes a second diameter, the second diameter larger than the first diameter.

7. The engine according to claim 1, comprising a fuel manifold and an oxidizer manifold, wherein the propellant manifold is the fuel manifold.

8. The engine according to claim 7, wherein the sense line is provided by a tube, the tube penetrates an annular passageway of the fuel manifold.

9. The engine according to claim 8, wherein the fuel and oxidizing manifolds are arranged over one another to provide a disc-shaped structure, the annular passageway arranged about a perimeter of the structure.

10. An injector assembly for a rocket engine comprising: a fuel manifold and an oxidizer manifold; and a sense line extending through the fuel manifold and into a combustion chamber, the sense line including a venturi arranged downstream from the combustion chamber, and the sense line including at least one aperture fluidly connecting the fuel manifold to a passageway downstream from the venturi, wherein the venturi includes a throat, and the aperture is located near the throat, the throat includes a first diameter and the sense-line passage includes a second diameter, the second diameter larger than the first diameter.

11. An engine comprising:
a vessel;
a combustion chamber; and
a pressure sensor in fluid communication with the combustion chamber via a conduit, wherein the conduit has a venturi and an aperture, wherein the venturi is between the chamber and the sensor, wherein the aperture is between the venturi and the sensor, wherein the aperture is in fluid communication with the vessel.

\* \* \* \* \*